(12) United States Patent
Koorapaty et al.

(10) Patent No.: US 9,735,939 B2
(45) Date of Patent: Aug. 15, 2017

(54) NETWORK NODE, USER EQUIPMENT AND METHODS THEREIN FOR TRANSMITTING AND RECEIVING CONTROL INFORMATION

(75) Inventors: Havish Koorapaty, Saratoga, CA (US); Jung-Fu Cheng, Fremont, CA (US); Mattias Frenne, Uppsala (SE); Johan Furuskog, Stockholm (SE); Daniel Larsson, Stockholm (SE); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 352 days.

(21) Appl. No.: 13/580,654

(22) PCT Filed: Apr. 26, 2012

(86) PCT No.: PCT/SE2012/050440
§ 371 (c)(1),
(2), (4) Date: Aug. 22, 2012

(87) PCT Pub. No.: WO2013/070138
PCT Pub. Date: May 16, 2013

(65) Prior Publication Data
US 2013/0121267 A1     May 16, 2013

Related U.S. Application Data

(60) Provisional application No. 61/558,477, filed on Nov. 11, 2011.

(51) Int. Cl.
*H04W 72/04* (2009.01)
*H04L 5/00* (2006.01)
*H04W 72/12* (2009.01)

(52) U.S. Cl.
CPC ......... *H04L 5/0053* (2013.01); *H04W 72/121* (2013.01); *H04L 5/0007* (2013.01); *H04W 72/1289* (2013.01)

(58) Field of Classification Search
USPC .......................................... 370/329; 455/450
See application file for complete search history.

(56) References Cited

U.S. PATENT DOCUMENTS

| 2007/0049311 A1* | 3/2007 | Lindoff | H04W 88/02 455/515 |
| 2008/0188247 A1* | 8/2008 | Worrall | H04W 68/025 455/458 |

(Continued)

FOREIGN PATENT DOCUMENTS

EP     2330785 A1     6/2011

OTHER PUBLICATIONS

3rd Generation Partnership Project. "VoIP Group Scheduling." 3GPP TSG RAN WG1#44, R1-060398, Denver, USA, Feb. 13-17, 2006.

(Continued)

*Primary Examiner* — Kevin C Harper
*Assistant Examiner* — Derrick V Rose
(74) *Attorney, Agent, or Firm* — Coats & Bennett, PLLC

(57) ABSTRACT

A method in a network node for transmitting control information to a user equipment in a telecommunications system is provided. The control information is scheduled in time intervals of a downlink shared data channel, wherein the control information is allocated resource elements in resource blocks of a time-frequency Orthogonal Frequency Division Multiplexing, OFDM, grid in the time intervals in which the control information is scheduled. The network node determines for a time interval, a set of user equipments for which control information is scheduled in the time interval. Also, it selects for a user equipment comprised in the determined set of user equipments, at least one group of user equipments amongst one or more groups of user equipments to which the user equipment is assigned. It also prepares a group signal corresponding to the selected one group of user equipments by allocating resource elements in the resource blocks of the time interval to the group signal. Furthermore, the network node transmits the prepared group (Continued)

signal in the allocated resource element in the time interval to the user equipment such that the user equipment is enabled to determine whether the control information that is allocated resource elements in the time interval is intended for the user equipment or not.

A network node, a method in user equipment and a user equipment are also provided.

30 Claims, 10 Drawing Sheets

(56) References Cited

U.S. PATENT DOCUMENTS

| | | | |
|---|---|---|---|
| 2010/0246527 A1* | 9/2010 | Montojo et al. | 370/330 |
| 2011/0085506 A1* | 4/2011 | Lee et al. | 370/329 |
| 2011/0182200 A1* | 7/2011 | Wan | H04W 72/1289 370/252 |
| 2011/0249633 A1 | 10/2011 | Hong et al. | |
| 2012/0163305 A1* | 6/2012 | Nimbalker et al. | 370/329 |
| 2012/0170479 A1* | 7/2012 | Ren et al. | 370/252 |
| 2012/0282936 A1* | 11/2012 | Gao | H04L 5/0023 455/450 |
| 2013/0265924 A1* | 10/2013 | Kim | H04W 52/0235 370/311 |

OTHER PUBLICATIONS

3rd Generation Partnership Project. "Group Scheduling for Downlink and Uplink." 3GPP TSG RAN WG1 #47, R1-063171, Riga, Latvia, Nov. 6-10, 2006.

* cited by examiner

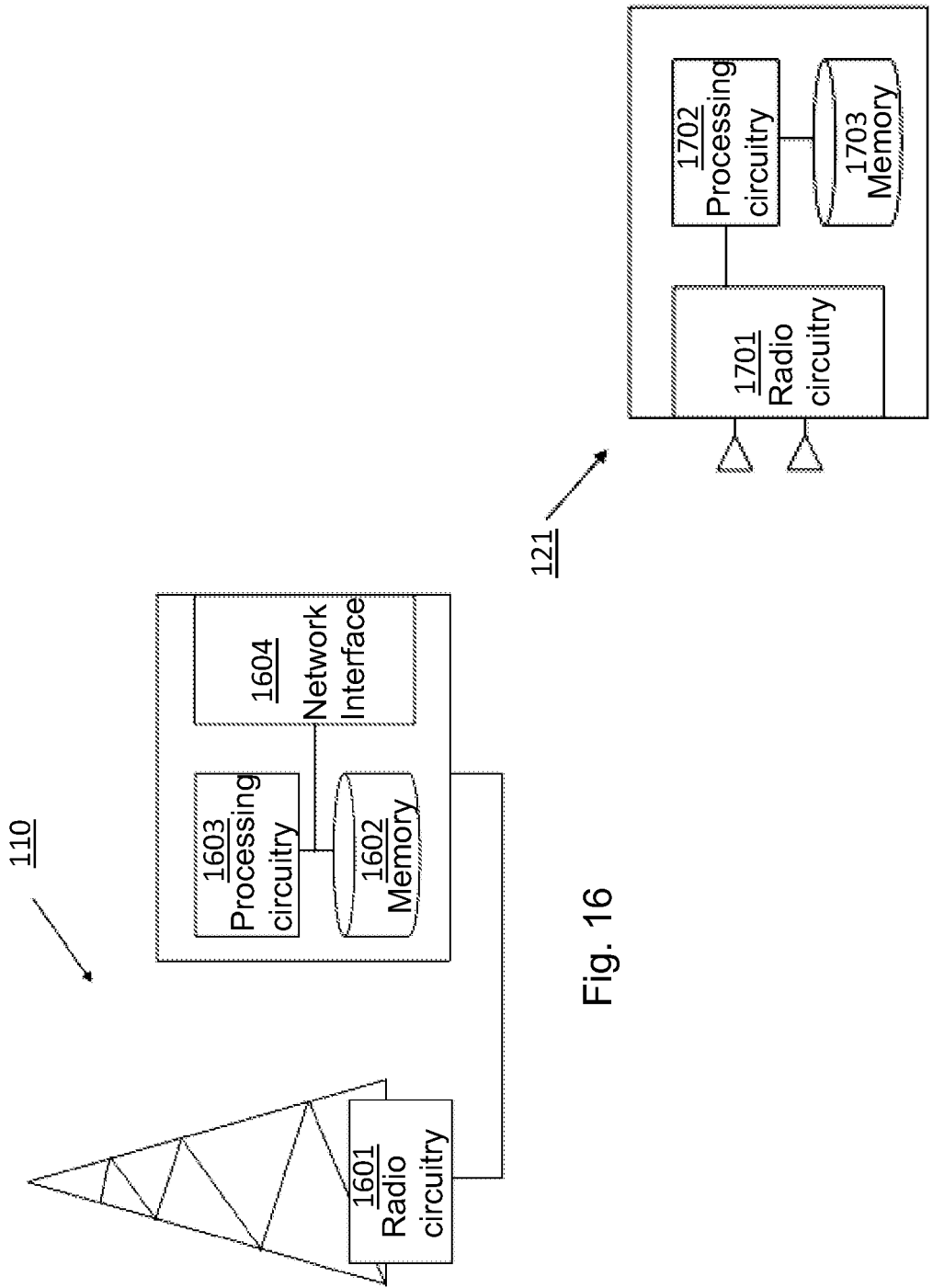

NETWORK NODE, USER EQUIPMENT AND METHODS THEREIN FOR TRANSMITTING AND RECEIVING CONTROL INFORMATION

TECHNICAL FIELD

Embodiments herein relate to a network node, a user equipment and methods therein. In particular, embodiments herein relate to transmitting and receiving control information in a telecommunications system.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for radio communication. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

Long Term Evolution (LTE) is a project within the 3rd Generation Partnership Project (3GPP) to evolve the WCDMA standard towards the fourth generation (4G) of mobile telecommunication networks. In comparisons with third generation (3G) WCDMA, LTE provides increased capacity, much higher data peak rates and significantly improved latency numbers. For example, the LTE specifications support downlink data peak rates up to 300 Mbps, uplink data peak rates of up to 75 Mbit/s and radio access network round-trip times of less than 10 ms. In addition, LTE supports scalable carrier bandwidths from 20 MHz down to 1.4 MHz and supports both Frequency Division Duplex (FDD) and Time Division Duplex (TDD) operation.

LTE technology is a mobile broadband wireless communication technology in which transmissions are sent using orthogonal frequency division multiplexing (OFDM), wherein the transmissions are sent from base stations, also referred to herein as network nodes or eNBs, to mobile stations, also referred to herein as user equipments or UEs. The transmission OFDM splits the signal into multiple parallel sub-carriers in frequency.

A basic unit of transmission in LTE is a Resource Block (RB) which in its most common configuration comprises 12 subcarriers and 7 OFDM symbols in one time slot. A unit of one subcarrier and 1 OFDM symbol is referred to as a resource element (RE), as shown in FIG. 1. Thus, an RB comprises 84 REs.

Accordingly, a basic LTE downlink physical resource may thus be seen as a time-frequency grid as illustrated in FIG. 1, where each Resource Element (RE) corresponds to one OFDM subcarrier during one OFDM symbol interval. A symbol interval comprises a cyclic prefix (cp), which cp is a prefixing of a symbol with a repetition of the end of the symbol to act as a guard band between symbols and/or facilitate frequency domain processing. Frequencies for subcarriers having a subcarrier spacing Δf are defined along an z-axis and symbols are defined along an x-axis.

In the time domain, LTE downlink transmissions are organized into radio frames of 10 ms, each radio frame comprising ten equally-sized sub-frames, #0-#9, each with a $T_{sub-frame}=1$ ms of length in time as shown in FIG. 2. Furthermore, the resource allocation in LTE is typically described in terms of resource blocks, where a resource block corresponds to one slot of 0.5 ms in the time domain and 12 subcarriers in the frequency domain. Resource blocks are numbered in the frequency domain, starting with resource block 0 from one end of the system bandwidth.

An LTE radio sub-frame is composed of multiple RBs in frequency with the number of RBs determining the bandwidth of the system and two slots in time, as shown in FIG. 3. Furthermore, the two RBs in a sub-frame that are adjacent in time are denoted as an RB pair.

The signal transmitted by the network node in a downlink, that is, the link carrying transmissions from the network node to the user equipment, sub-frame may be transmitted from multiple antennas and the signal may be received at a user equipment that has multiple antennas. The radio channel distorts the transmitted signals from the multiple antenna ports. In order to demodulate any transmissions on the downlink, a user equipment relies on Reference Signals (RS) that are transmitted on the downlink. These RS and their position in the time-frequency grid are known to the user equipment and hence may be used to determine channel estimates by measuring the effect of the radio channel on these signals.

It should be noted in this context that the channel a user equipment measures is not necessarily from a particular physical transmit antenna element at the network node to the user equipments receiver antenna element, since the user equipment base the measurement on a transmitted RS and the channel it measures depends on how the particular RS is transmitted from the multiple physical antenna elements at the network node. Therefore, the concept of an antenna port is introduced, where an antenna port is a virtual antenna that is associated with a RS.

Hence, a user equipment measures the channel from an antenna port to the receiver antenna element using the RS associated with that antenna port but which or which group of physical transmit antenna elements that are actually used for the transmission of this RS is transparent and also irrelevant for the user equipment. The transmission on an antenna port may use a single physical antenna element or a combination of signals from multiple antenna elements. Hence, in an effective channel that the user equipment measures from the antenna port, the used precoding or mapping to physical antenna elements is transparently included.

An example of utilization of multiple antenna elements is the use of transmit precoding to direct the transmitted energy towards one particular receiving user equipment, by using all available antenna elements for transmission to transmit the same message, but where individual phase and possibly amplitude weights are applied at each transmit antenna element. This is sometimes denoted UE-specific precoding and the RS in this case is denoted UE-specific RS. If the transmitted data in the RB is pre-coded with the same UE-specific precoding as the data, then the transmission is performed using a single virtual antenna, i.e. a single antenna port, and the user equipment need only to perform channel estimation using this single UE-specific RS and use it as a reference for demodulating the data in this RB.

The UE-specific RS are transmitted only when data is transmitted to a user equipment in the sub-frame otherwise they are not present. In LTE, UE-specific RS are included as part of the RBs that are allocated to a user equipment for reception of user data.

FIG. 4 shows examples of UE-specific reference signals in LTE, where for example all RE denoted $R_7$ belong to one "RS", hence what is known as an RS is a collection of distributed REs comprising reference symbols.

Another type of reference signals are those that may be used by all user equipments and thus have wide cell area coverage. One example of these is the Common Reference Signals (CRS) that are used by user equipments for various purposes including channel estimation and mobility measurements. These CRS are defined so that they occupy certain pre-defined REs within all the sub-frames in the system bandwidth irrespective of whether there is any data being sent to users in a sub-frame or not. In FIG. 3, these CRS are shown as "reference signals" or "reference signals comprising a set of reference symbols".

Messages transmitted over the radio link to users may be broadly classified as control messages or data messages. Control messages are used to facilitate the proper operation of the system as well as proper operation of each user equipment within the system. Control messages could include commands to control functions such as the transmitted power from a user equipment, signalling of RBs within which the data is to be received by the user equipment or transmitted from the user equipment and so on. Examples of control messages are the Physical Downlink Control CHannel (PDCCH), the Physical HARQ Indicator CHannel (PHICH), and the physical broadcast channel (PBCH). The PDCCH may, for example, carry scheduling information and power control messages. The PHICH may carry one form of Acknowledgment (ACK)/non-Acknowledgment (NACK)-messages in response to a previous uplink transmission. The PBCH may carry system information.

In LTE Release 10, control messages are demodulated using the CRS, except for a R-PDCCH case as discussed below. Hence, the control messages have a wide cell coverage to reach all user equipments in the cell without having knowledge about their position. The first one to four OFDM symbols, depending on the configuration, in a sub-frame may be reserved for control information, as shown in FIG. 3. Control messages may be categorized into those types of messages that need to be sent only to one user equipment, i.e. UE-specific control information, and those that need to be sent to all user equipments or some subset of user equipments numbering more than one, i.e. common control information, within the cell being covered by the network node.

It shall be noted in this context that in future LTE releases, there will be new carrier types which may not have a PDCCH transmission or transmission of CRS.

PDCCH Processing

Control messages of PDCCH type are transmitted in multiples of units called Control Channel Elements (CCEs). Each CCE maps to 36 REs. A PDCCH may have an Aggregation Level (AL) of 1, 2, 4 or 8 CCEs to allow for link adaptation of the control message. Furthermore, each CCE is mapped to 9 Resource Element Groups (REGs) comprising 4 REs each. These REGs are distributed over the whole bandwidth to provide frequency diversity for a CCE. Hence, the PDCCH, which comprises up to 8 CCEs spans the entire system bandwidth in the first n={1, 2, 3 or 4} OFDM symbols, depending on the configuration.

In FIG. 5, one CCE belonging to a PDCCH is mapped to the control region which spans the whole system bandwidth.

After channel coding, scrambling, modulation and interleaving of the control information the modulated symbols are mapped to the resource elements in the control region. In total there are $N_{CCE}$ CCEs available for all the PDCCH to be transmitted in the sub-frame and the number $N_{CCE}$ varies from sub-frame to sub-frame depending on the number of control symbols n.

As $N_{CCE}$ varies from sub-frame to sub-frame, the terminal needs to blindly determine the position and the number of CCEs used for its PDCCH which may be a computationally intensive decoding task. Therefore, some restrictions in the number of possible blind decodings a terminal needs to go through have been introduced. For instance, the CCEs are numbered and CCE aggregation levels of size K may only start on CCE numbers evenly divisible by K.

Enhanced Control Channel (eCCH)

Transmission of the Physical Downlink Shared CHannel (PDSCH) to user equipments may use REs in RB pairs that are not used for control messages or RS. Further, the PDSCH may either be transmitted using the UE-specific reference symbols or the CRS as a demodulation reference, depending on the transmission mode. The use of UE-specific RS allows a multi-antenna network node to optimize the transmission using pre-coding of both data and reference signals being transmitted from the multiple antennas so that the received signal energy increases at the user equipment. Consequently, the channel estimation performance is improved and the data rate of the transmission could be increased.

In LTE Release 10, a relay control channel was also defined and denoted R-PDCCH. The R-PDCCH is used for transmitting control information from network node to Relay Nodes (RN). The R-PDCCH is placed in the data region, hence, similar to a PDSCH transmission. The transmission of the R-PDCCH may either be configured to use CRS to provide wide cell coverage, or RN specific reference signals to improve the link performance towards a particular RN by precoding, similar to the PDSCH with UE-specific RS. The UE-specific RS is in the latter case used also for the R-PDCCH transmission. The R-PDCCH occupies a number of configured RB pairs in the system bandwidth and is thus frequency multiplexed with the PDSCH transmissions in the remaining RB pairs, as shown in FIG. 6.

FIG. 6 shows a downlink sub-frame showing 10 RB pairs and transmission of 3 R-PDCCH, that is, red, green or blue, of size 1 RB pair each. The R-PDCCH does not start at OFDM symbol zero to allow for a PDCCH to be transmitted in the first one to four symbols. The remaining RB pairs may be used for PDSCH transmissions.

In LTE Release 11 discussions, attention has turned to adopt the same principle of UE-specific transmission as for the PDSCH and the R-PDCCH for enhanced control channels, that is, including PDCCH, PHICH, PBCH, and Physical Configuration Indication CHannels (PCFICH). This may be done by allowing the transmission of generic control messages to a user equipment using such transmissions to be based on UE-specific reference signals. This means that precoding gains may be achieved also for the control channels. Another benefit is that different RB pairs may be allocated to different cells or different transmission points within a cell. Thereby, inter-cell interference coordination between control channels may be achieved. This frequency coordination is not possible with the PDCCH, since the PDCCH spans the whole bandwidth.

FIG. 7 shows an enhanced PDCCH (ePDCCH) which, similar to the CCE in the PDCCH, is divided into multiple groups and mapped to one of the enhanced control regions. That is, FIG. 7 shows a downlink sub-frame showing a CCE belonging to an ePDCCH that is mapped to one of the enhanced control regions, to achieve localized transmission.

Note that, in FIG. 7, the enhanced control region does not start at OFDM symbol zero, to accommodate simultaneous transmission of a PDCCH in the sub-frame. However, as was mentioned above, there may be carrier types in future LTE releases that do not have a PDCCH, in which case the enhanced control region could start from OFDM symbol zero within the sub-frame.

Even if the enhanced control channel enables UE-specific precoding and such localized transmission, as shown in FIG. 7, the enhanced control channel may in some cases be transmitted in a broadcasted, wide area coverage fashion. This may be useful if the network node does not have reliable information to perform precoding towards a certain user equipment. In this case, a wide area coverage transmission is more robust, although the precoding gain is lost. Another case is when the particular control message is intended to more than one user equipment. In this case, the UE-specific precoding cannot be used. An example is the transmission of the common control information using PDCCH, that is, in the common search space. In yet another case, sub-band precoding may be utilized, since the user equipment estimates the channel in each RB pair individually. This means that the network node may choose different precoding vectors in the different RB pairs, if the network node has such information that the preferred precoding vectors is different in different parts of the frequency band.

In any of these cases a distributed transmission may be used, as shown in FIG. 8, where the eREG belonging to the same ePDCCH are distributed over the enhanced control regions. FIG. 8 shows a downlink sub-frame showing a CCE belonging to an ePDCCH is mapped to multiple of the enhanced control regions, to achieve distributed transmission and frequency diversity or sub-band precoding.

In a telecommunications system, as described above, the transmission and reception of radio signals consumes large amounts of energy in the devices comprised therein.

SUMMARY

It is an object of embodiments herein to provide a way of reducing energy-consumption in a telecommunications system.

According to a first aspect of embodiments herein, the object is achieved by a method in a network node for transmitting control information to a user equipment in a telecommunications system. The control information is scheduled in time intervals of a downlink shared data channel. The control information is allocated resource elements in resource blocks of a time-frequency Orthogonal Frequency Division Multiplexing, OFDM, grid in the time intervals in which the control information is scheduled. The network node determines for a time interval, a set of user equipments for which control information is scheduled in the time interval. Also, it selects for a user equipment comprised in the determined set of user equipments, at least one group of user equipments amongst one or more groups of user equipments to which the user equipment is assigned. The network node also prepares a group signal corresponding to the selected one group of user equipments by allocating resource elements in the resource blocks of the time interval to the group signal. Furthermore, the network node transmits the prepared group signal in the allocated resource elements in the time interval to the user equipment such that the user equipment is enabled to determine whether the control information that is allocated resource elements in the time interval is intended for the user equipment or not.

According to a second aspect of embodiments herein, the object is achieved by a network node for transmitting control information to a user equipment in a telecommunications system. The control information is scheduled in time intervals of a downlink shared data channel. The control information is allocated resource elements in resource blocks of a time-frequency Orthogonal Frequency Division Multiplexing, OFDM, grid in the time intervals in which the control information is scheduled. The network node comprises a processing circuitry configured to determine for a time interval, a set of user equipments for which control information is scheduled in the time interval. Also, the processing circuitry is configured to select for a user equipment comprised in the determined set of user equipments, at least one group of user equipments amongst one or more groups of user equipments to which the user equipment is assigned. The processing circuitry is also configured to prepare a group signal corresponding to the selected one group of user equipments by allocating resource elements in the resource blocks of the time interval to the group signal. Furthermore, the processing circuitry is configured to transmit the prepared group signal in the allocated resource elements in the time interval to the user equipment such that the user equipment is enabled to determine whether the control information that is allocated resource elements in the time interval is intended for the user equipment or not.

According to a third aspect of embodiments herein, the object is achieved by a method in a user equipment for receiving control information from a network node in a telecommunications system. The control information is scheduled in time intervals of a downlink shared data channel. The control information is allocated resource elements in resource blocks of a time-frequency Orthogonal Frequency Division Multiplexing, OFDM, grid in the time intervals in which the control information is scheduled. The user equipment receives a control information transmission comprising a prepared group signal and control information in a time interval in which the user equipment is expecting a control information transmission from the network node. Then, when the user equipment determines for the time interval that the prepared group signal is not corresponding to a group of user equipments to which the user equipment is assigned and thereby that the control information that is allocated resource elements in the time interval is not intended for the user equipment, the user equipment ends the reception of the control information transmission for the time interval.

According to a fourth aspect of embodiments herein, the object is achieved by a user equipment for receiving control information from a network node in a telecommunications system. The control information is scheduled in time intervals of a downlink shared data channel. The control information is allocated resource elements in resource blocks of a time-frequency Orthogonal Frequency Division Multiplexing, OFDM, grid in the time intervals in which the control information is scheduled. The user equipment comprises a processing circuitry configured to receive a control information transmission comprising a prepared group signal and control information in a time interval in which the user equipment is expecting a control information transmission from the network node. Then, when the processing circuitry determines for the time interval that the prepared group signal is not corresponding to a group of user equipments to which the user equipment is assigned and thereby that the control information that is allocated resource elements in the time interval is not intended for the user equipment, the processing circuitry is configured to end the reception of the control information transmission for the time interval.

By transmitting a prepared group signal from the network node as described above, a user equipment is enabled to determine whether the control information in the time interval is intended for the user equipment or not.

It follows that, in case the user equipment is not scheduled in a time interval in which the user equipment is expecting a data transmission from the network node, the user equipment may obtain knowledge that the user equipment is not scheduled for the time interval. Thus, the user equipment may be configured to stop receiving the data transmission in the time interval prior to the end of the time interval. This enables the user equipment to go into a micro-sleep for the rest of the duration of the time interval. This advantageously reduces the energy-consumption of the user equipment and extends the user equipments battery lifetime.

Hence, a way of reducing energy-consumption in a telecommunications system is achieved.

BRIEF DESCRIPTION OF THE DRAWINGS

The above and other features and advantages of the embodiments will become readily apparent to those skilled in the art by the following detailed description of exemplary embodiments thereof with reference to the accompanying drawings, wherein:

FIG. 16 is a schematic block diagram of embodiments of a network node, FIG. 17 is a schematic block diagram of embodiments of a user equipment.

DETAILED DESCRIPTION

Figure 1:
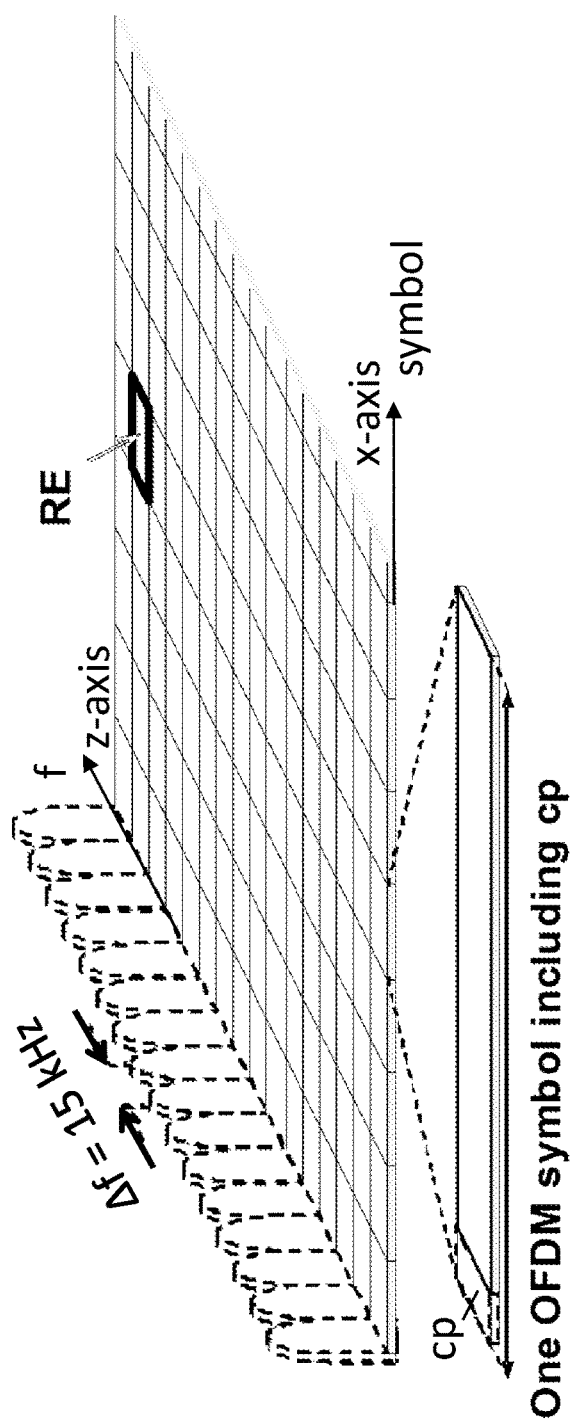
FIG. 1 is a schematic block diagram of a LTE downlink physical resource.

The figures are schematic and simplified for clarity, and they merely show details which are essential to the understanding of the embodiments, while other details have been left out. Throughout, the same reference numerals are used for identical or corresponding parts or steps.

As part of the developing the embodiments described herein, a problem will first be identified and discussed.

In some scenarios, it has been noted that since the eCCH structure, e.g. the ePDCCH structure, extends to both slots in a sub-frame, a user equipment that is scheduled in a sub-frame has to wait until the end of the sub-frame to start processing the eCCH comprised therein.

It has also been observed that, for a user equipment that is not scheduled for this sub-frame, the user equipment still has to receive the radio signal for the duration of the entire sub-frame. This means that the non-scheduled user equipment cannot stop receiving the downlink radio signal before the end of the sub-frame.

Hence, it would be desirable if the user equipment could obtain knowledge that it is not scheduled for a particular sub-frame and to stop receiving downlink signals before the end of this sub-frame. This would allow the user equipment to go into a short idle period, commonly referred to as a micro-sleep, for the rest of the duration of the sub-frame. This micro-sleep feature may improve, i.e. reduce, the energy consumption of the user equipment. This may in turn, for example, extend the battery life-time of the user equipment.

Figure 9:
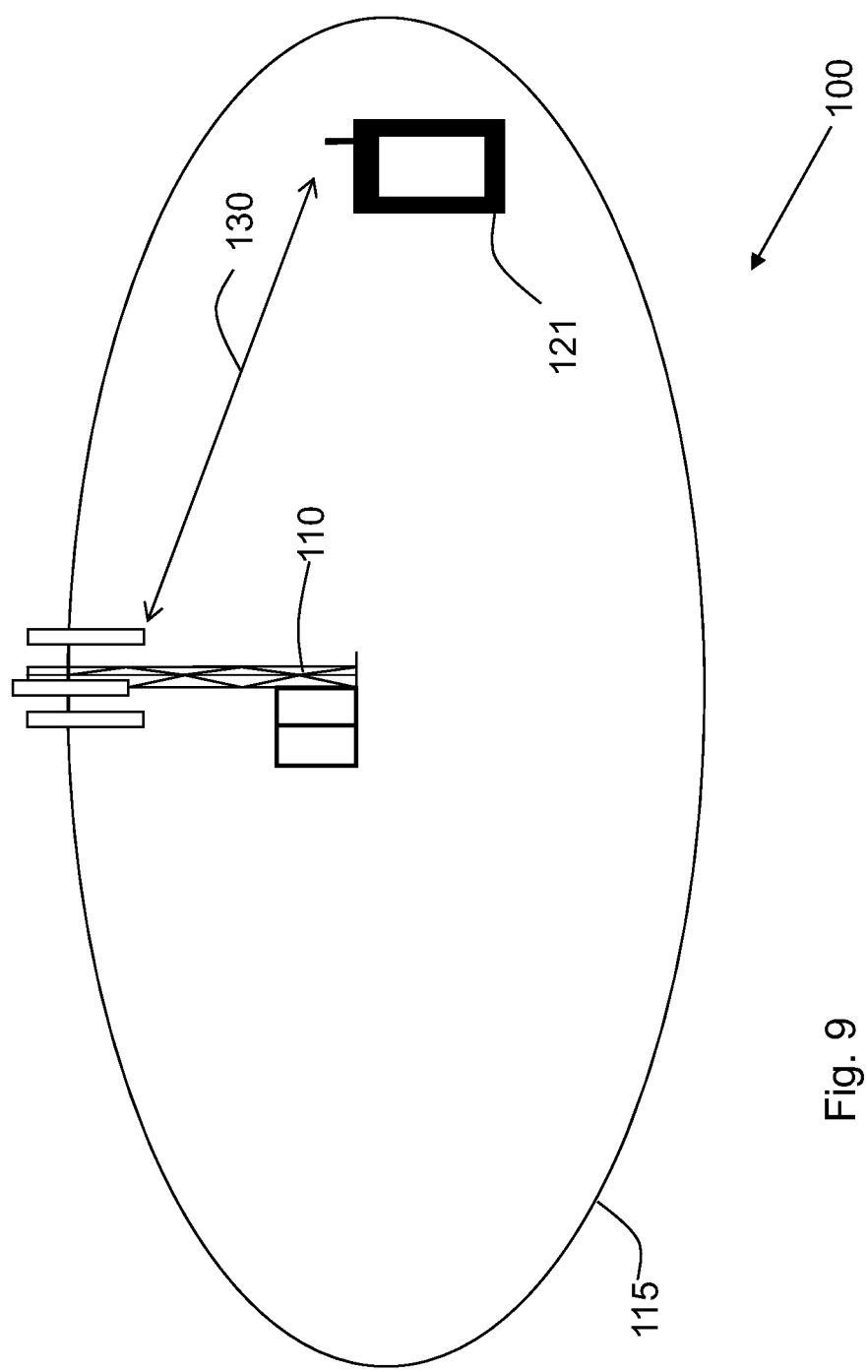
FIG. 9 is a schematic block diagram illustrating embodiments in a telecommunications system.

FIG. 9 depicts a telecommunications system 100 in which embodiments herein may be implemented. The cellular communications system 100 is a wireless communication network such as an LTE, WCDMA, GSM network, any 3GPP cellular network, or any cellular network or system.

The telecommunications system 100 comprises a base station, which is a network node and is therefore referred to herein as the network node 110. The network node 110 serves a cell 115. The network node 110 may in this example e.g. be an eNB, eNodeB, or a Home Node B, a Home eNode B, femto Base Station (BS), pico BS or any other network unit capable to serve a user equipment or a machine type communication device which are located in the cell 115 in the telecommunications system 100.

A user equipment 121 is located within the cell 115. The user equipment 121 is configured to communicate within the telecommunications system 102 via the network node 110 over a radio link 130 when the user equipment 121 is present in the cell 115 served by the network node 110. The user equipment 121 may, for example, be a mobile terminal or a wireless terminal, a mobile phone, a computer such as for example a laptop, a Personal Digital Assistant (PDA) or a tablet computer, sometimes referred to as a surf plate, with wireless capability, a device equipped with a wireless interface, such as a printer or a file storage device or any other radio network unit capable of communicating over a radio link in a telecommunications system.

Figure 10:
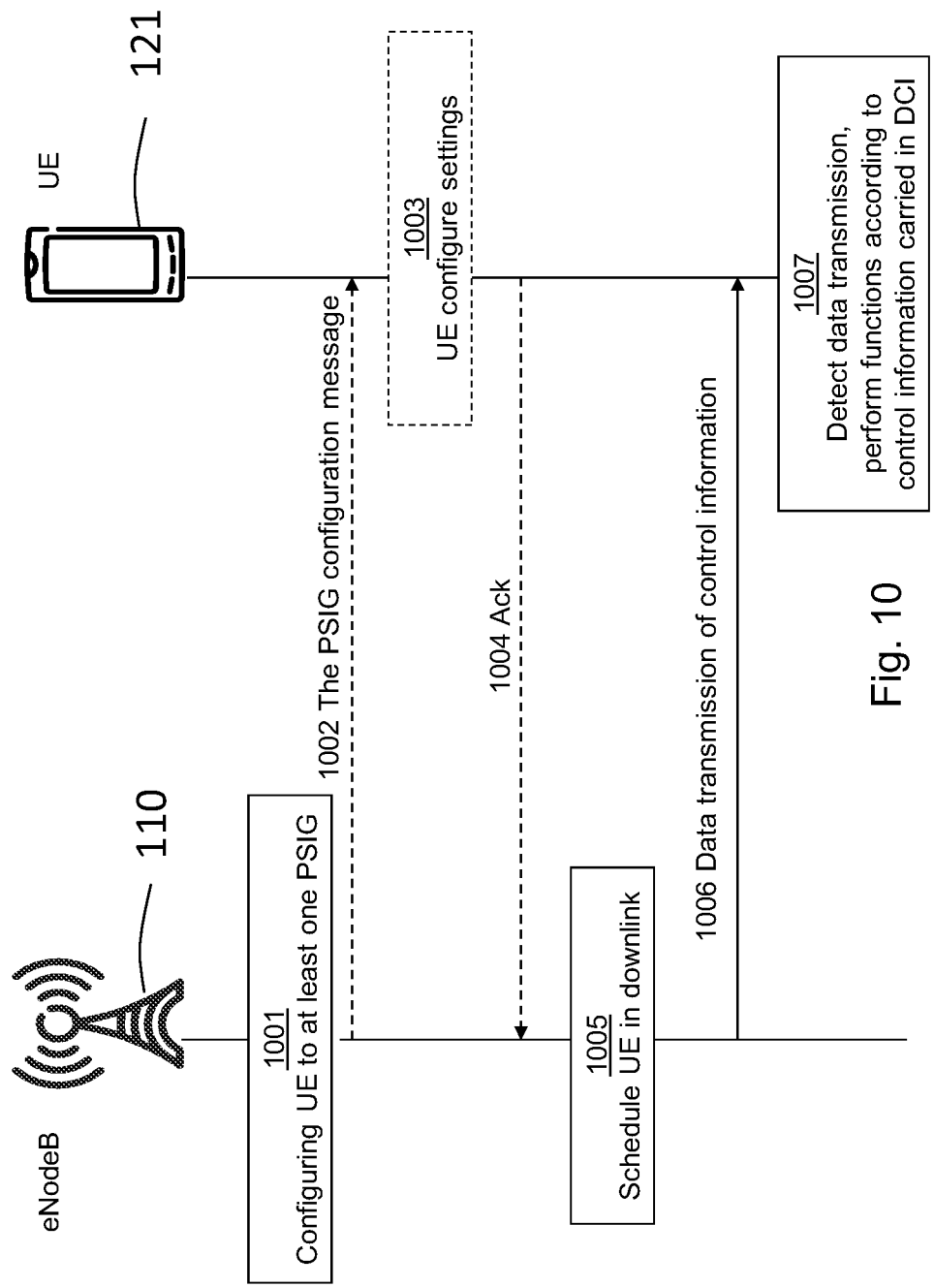
FIG. 10 is a signalling scheme depicting embodiments of a method in the telecommunications system.

Embodiments of a method in a telecommunications system will now be described with reference to the signalling scheme between the network node 110 and the user equipment 121 depicted in FIG. 10. The signalling scheme in FIG. 10 may comprise the following actions, and may be implemented for any of the below mentioned embodiments or in any combination with those. Note that an overview of the signalling scheme is illustrated in FIG. 10, and that all the steps performed may not be shown in order to simplify.

Actions 1001

In this action, the network node 110 configures the user equipment 121 to at least one group of user equipments of a number of groups of user equipments. The groups of user equipments may be denoted Physical Scheduling Indication Groups (PSIG). In the network node 110, each user equipment 121 may be configured to be a member of a PSIG. A user equipment 121 may also be configured to belong to more than one PSIG. This assignment to one or more PSIG may be based on, for example, user equipment ID, sub-frame number, cell-ID, or other relevant parameters. Thus, the network node 110 may configure, in the network node 110, the user equipment 121 to be assigned to one or more PSIG.

Furthermore, the assignment(s) to one or more PSIG for the user equipment 121 may be based on the user equipment ID, sub-frame number or cell-ID.

An advantage of grouping or assigning a user equipment 121 to more than one PSIG is that it may reduce the number of PSICH signals (see e.g. Action 1006) that has to be sent on average. This is because the set of user equipments 121 that needs to be scheduled in any given subframe may be arbitrary. Another reason for grouping or assigning user equipments 121 together in PSIGs may be because the user equipments 121 have different capabilities, such as, e.g. the capability to receive transmissions using a certain multi-antenna transmission mode, etc.

Action 1002

According to some embodiments, the network node 110 sends a PSIG configuration message to the user equipment 121 for configuring the user equipment 121 with the PSIG assignment. It should also be noted that the message is not limited to being a PSIG configuration message, but may be any type of configuring message sent to the user equipment 121 to configure the settings of the user equipment 121. This means that the network node 110 may send a configuration message to the user equipment 121 to configure its user equipment settings such that the user equipment 121 is able to determine presence of a PSICH signal (see e.g. Action 1006) in received control information transmissions from the network node 110. The configuration message may comprise the group assignment(s) for the user equipment 121.

The network node 110 may send the group assignment(s) for the user equipment 121 to the user equipment 121. The groups assignment(s), i.e. the PSIG assignment(s), may be communicated via RRC signalling from the network node 110.

Alternatively, the user equipment 121 may already be provided with the PSIG assignment.

Action 1003

According to some embodiments, the user equipment 121 receives the PSIG configuration message from the network node 110 and configures its settings. That is, the user equipment 121 may configure its settings in response to the received configuration message and be ready to start receiving and detecting data transmissions arriving from the network node 110 according to the PSIG assignment from the network node 110. This means that the user equipment 121 may receive a configuration message from the network node 110 to configure its user equipment settings such that the user equipment 121 is able to determine the presence of a PSICH signal (see e.g. Action 1006) in received control information transmissions from the network node 110. The configuration message may comprise the group assignment(s) of the user equipment 121.

Also, the PSIG assignment may be communicated to the user equipment 121 via RRC signalling from the network node 110. Thus, the user equipment 121 may receive one or more group assignment(s) indicating to the user equipment 121 which one or more PSIG the user equipment 121 is assigned to.

Action 1004

According to some embodiments, the user equipment 121 may, after receiving the PSIG configuration message in Action 1303, send an ACK/NACK-message back to the network node 110. This means that, for example, the user equipment 121 may send an ACK-message back to the network node 110 informing the network node 110 when the user equipment 121 has changed its settings, i.e. that the user equipment 121 is ready to receive messages according to the PSIG assignments received from the network node 110.

Action 1005

The network node 110 then schedules the user equipment 121 in a downlink transmission. This is described in more detail in reference to FIGS. 11, 13-15 below.

Action 1006

In this action, the network node 110 sends a data transmission of control information to the user equipment 121. This data transmission of control information may comprise at least one group signal and an enhanced Control CHannel (eCCH) signal. The group signal may be denoted as a Physical Scheduling Indicator Channel (PSICH) signal. Alternatively, in case of downlink scheduling, the data transmission of control information may also comprise a Physical Downlink Shared CHannel (PDSCH) signal.

In one embodiment, the PSICH signal, i.e. the group signal, may provide information that reduces blind decoding complexity for the user equipment 121. This may be done by associating the PSIG assignments to one or more PSIG(s) with certain blind decoding options, such as, for example, localized transmission. According to some embodiments, a way for providing such information comprises assigning certain transmission locations for the PSICH signal, i.e. the group signal, to certain blind decoding options. Thus, the location of the allocated resource elements in the PSICH signal and/or the selected PSIG, may indicate a subset of blind decoding options for the control information to the user equipment 121.

Action 1007

In this action, the user equipment 121 may detect data transmission from the network node 110. Thus, the user equipment 121 may start to receive the data transmission of control information. This is performed within time intervals in which the user equipment 121 is expecting a control information transmission from the network node 110. The user equipment 121 may here detect the presence of the Physical Scheduling Indicator Channel (PSICH), i.e. the group signal, corresponding to its PSIG, i.e. a group signal corresponding to one or more of the groups of user equipments in its PSIG assignment.

If the PSICH signal is detected, the user equipment 121 may follow normal eCCH blind decoding procedures for its scheduled control information. The user equipment 121 then performs actions and functions according to the information carried in the eCCH, such as, for example, Downlink Control Information (DCI).

If the PSICH signal is not detected, the user equipment 121 may enter a micro-sleep stage for the time interval.

This action is described in more detail in reference to FIG. 12 below.

Embodiments of a method in the network node 110 will now be described with reference to the flowchart depicted in FIG. 11. FIG. 11 is an illustrating example of a detailed flow chart for a procedure in the network node 110 to transmit control information to the user equipment 121. In other words, a more detailed procedure as seen from the side of the network node 110 in the embodiment of the method is shown in FIG. 10.

Figures 11, 12:
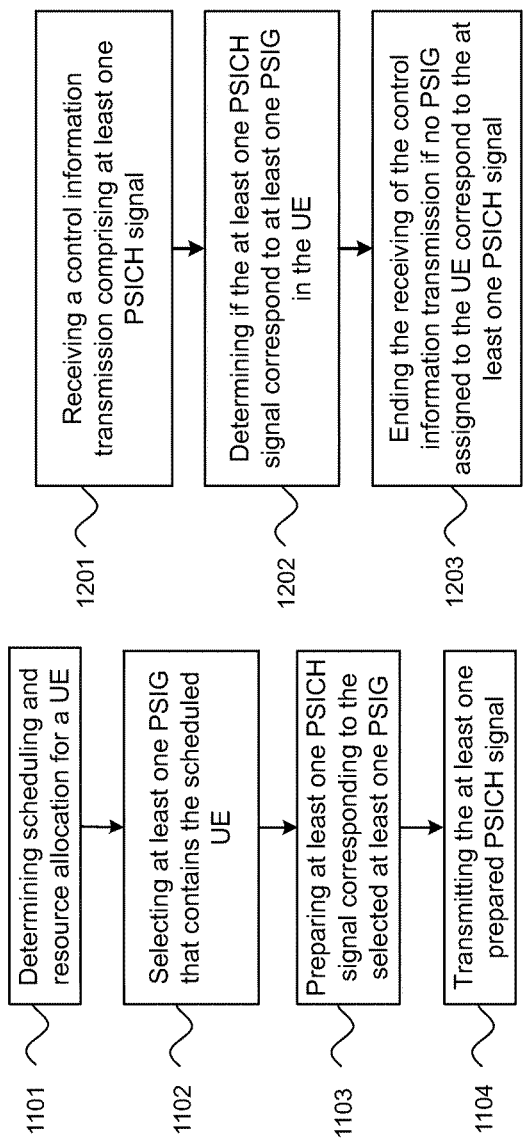
FIG. 11 is a flowchart depicting embodiments of a method in a network node.
FIG. 12 is a flowchart depicting embodiments of a method in a user equipment.

The flowchart in FIG. 11 describes the method in the network node 110 for transmitting control information to user equipments 121 in the telecommunications system 100. Furthermore, the flowchart in FIG. 11 comprises the following actions, and may be implemented for any of the above and below mentioned embodiments or in any combination with those. Note that the actions may be performed in any suitable order, and that all the steps performed may not be shown in order to simplify.

Action 1101

In this action, the network node 110 may determine scheduling and resource allocation for a user equipment 121. This means that the control information to the user equipment 121 is scheduled to be transmitted to the user equipment 121 in downlink shared data channel time intervals. The scheduled control information is allocated resources elements in resource blocks of a time-frequency Orthogonal Frequency Division Multiplexing (OFDM) grid in its respective downlink shared data channel time interval.

Figure 2:
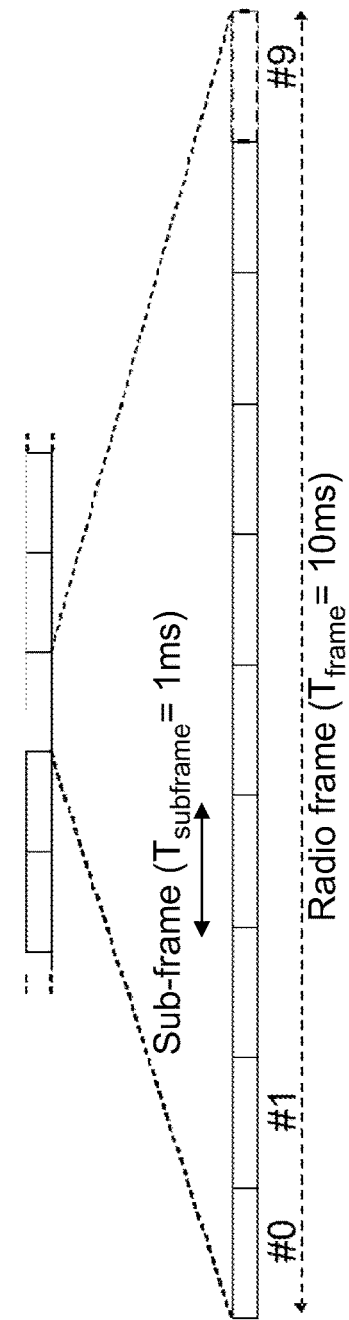
FIG. 2 is a schematic overview depicting radio frames.
Figure 3:
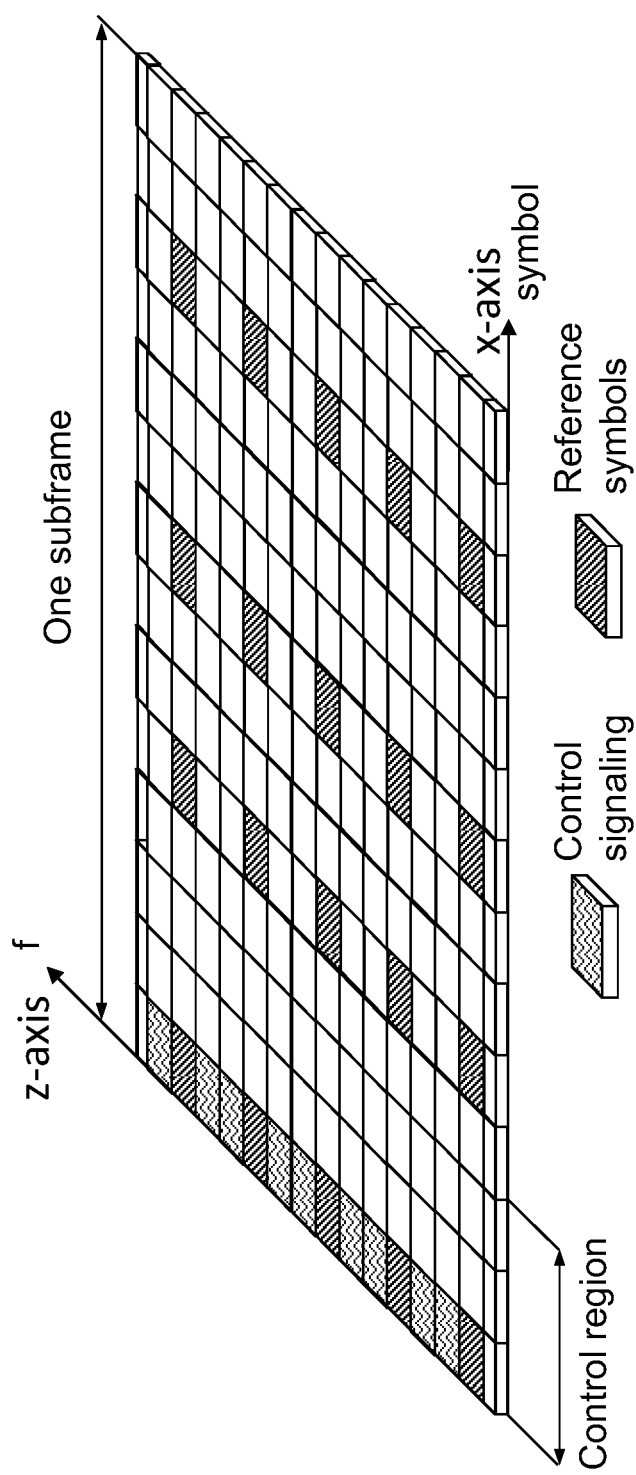
FIG. 3 is a schematic overview depicting a DL sub-frame.
Figure 5:
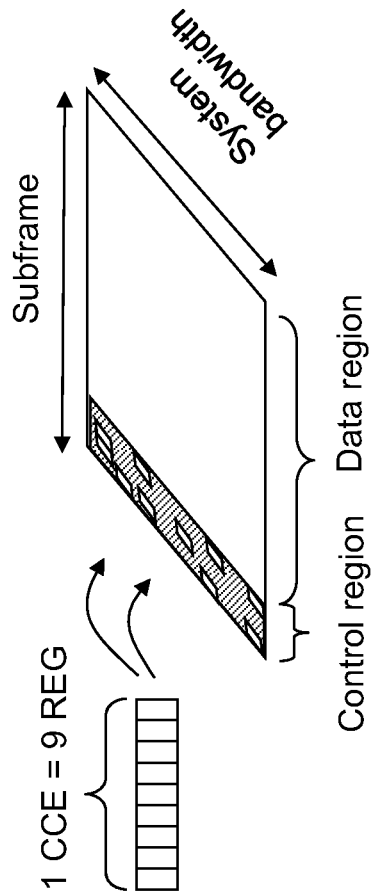
FIG. 5 is a schematic overview depicting control channel elements.
Figure 4:
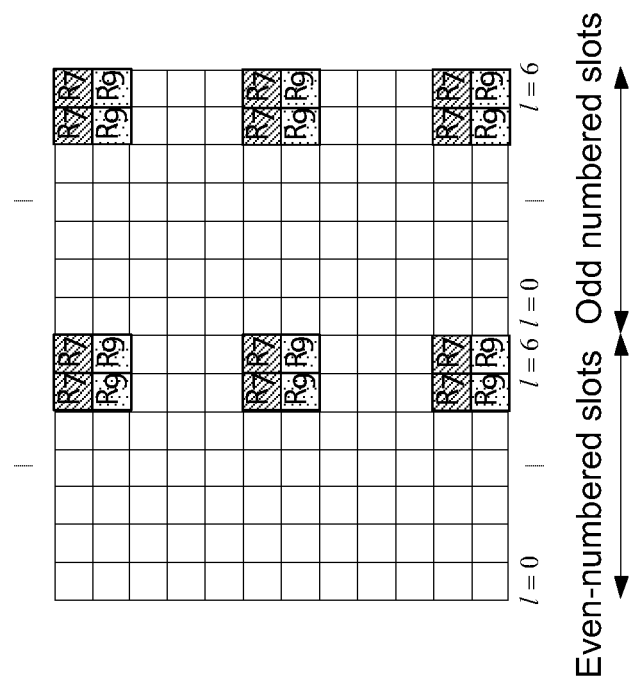
FIG. 4 are schematic examples of UE-specific RS in LTE.
Figure 6:
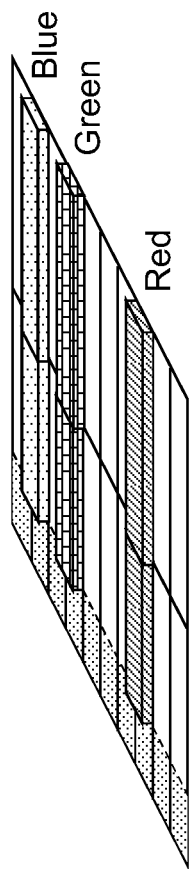
FIG. 6 is a schematic overview depicting a DL sub-frame comprising a relay control channel.
Figure 7:
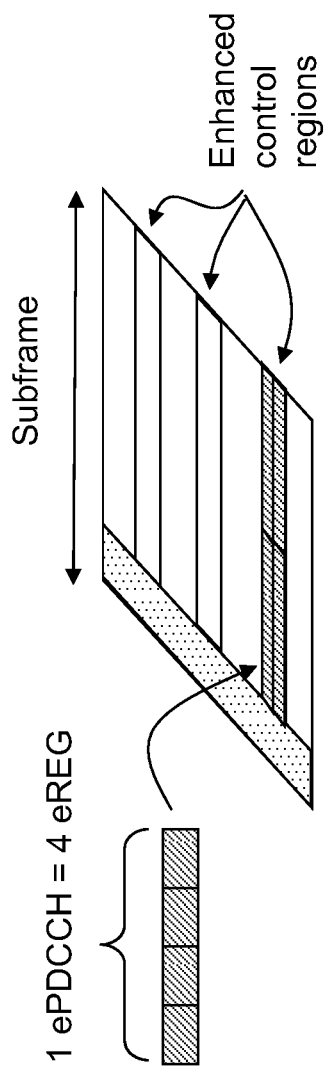
FIG. 7 is a schematic overview depicting a DL sub-frame comprising a CCE belonging to a PDCCH.
Figure 8:
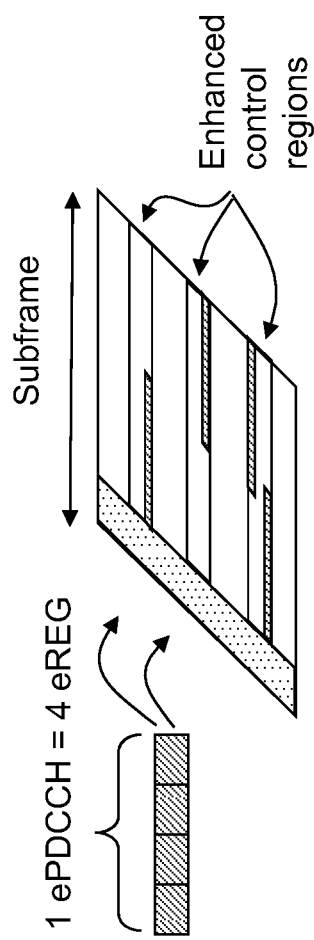
FIG. 8 is a schematic overview depicting a DL sub-frame comprising a CCE belonging to a PDCCH.

Furthermore, the network node 110 may, for each scheduling and transmission in a downlink (DL) shared data channel time interval, determine the set of user equipments 121 scheduled in the downlink (DL) shared data channel time interval. The DL shared data channel time interval may, for example, be 1 ms in Long Term Evolution (LTE) case. The DL shared data channel time interval may be denoted $T_{sub\text{-}frame}$, as illustrated in FIG. 2. Thus, the network node 110 determines for a time interval a set of user equipments 121 for which control information is scheduled in the time interval.

Actions 1102-1104 presented below is performed for each scheduled user equipment 121 in the set of scheduled user equipments 121 in the time interval.

Action 1102

In this action, the network node 110 selects at least one PSIG that comprises the scheduled user equipment 121. If a scheduled user equipment 121 is comprised in or belongs to one PSIG, the network node 110 may proceed to Action 1103 and prepare a group signal, that is, a PSICH signal, for the scheduled user equipment 121. This means that the network node 110 selects for a user equipment 121 comprised in a determined set of user equipments 121, at least one group of user equipments amongst one or more groups of user equipments to which the user equipment 121 is assigned.

However, if the scheduled user equipment 121 belongs to more than one PSIG, the network node 110 may select or choose one of the PSIGs when preparing the PSICH signal. The selection/choice of PSIG by the network node 110 may depend on a criteria, which criteria may comprise:

selecting/choosing the PSIG that comprises the highest number of user equipments 121 being scheduled in the current sub-frame, that is, the time interval, or selecting/choosing the PSIG based on the transmission mode and resources being used for the enhanced control channel (eCCH), that is, the control information. As previously mentioned in Action 1006, this may be performed so that some subset of blind decoding options to consider may be implicitly signalled to the user equipment 121, thus reducing blind decoding complexity.

According to some embodiments, a user equipment 121 may be assigned two PSIG, wherein one PSIG may be associated with a beamforming type eCCH transmissions and another PSIG may be associated with a diversity type eCCH transmissions. Further, the network node 110 may also prepare more than one PSICH signal targeting the same user equipment 121, that is, for example, preparing a PSICH signal for each PSIG to which the user equipment 121 is assigned.

This means that when the user equipment 121 is assigned to more than one PSIG, the network node 110 may select for the user equipment 121 amongst the more than one PSIG to which the user equipment 121 is assigned, the PSIG which comprises the highest number of user equipments 121 for which control information are scheduled in the time interval. Furthermore, wherein the user equipment 121 is assigned to more than one PSIG, the network node 110 may select for the user equipment 121 amongst the more than one PSIG to which the user equipment 121 is assigned, the PSIG based on the transmission mode of the control information or on resource elements allocated to the control information.

Action 1103

In this action, the network node 110 prepares at least one PSICH signal. If a scheduled user equipment 121 belongs to a PSIG as described in Action 1102, the network node 110 prepares a group signal, that is, a PSICH signal, in a PSICH transmission resource corresponding to the PSIG of the user equipment 121. Note that the PSIG is the one or more PSIG selected in Action 1102. The PSICH transmission resource is resource elements which may be allocated to the PSICH signal in resource blocks in the OFDM-grid in the time interval. Thus, the network node 110 prepares a group signal corresponding to the selected one group of user equipments by allocating resource elements in the resource blocks of the time interval to the group signal, that is, the PSICH signal.

Figures 13, 14:
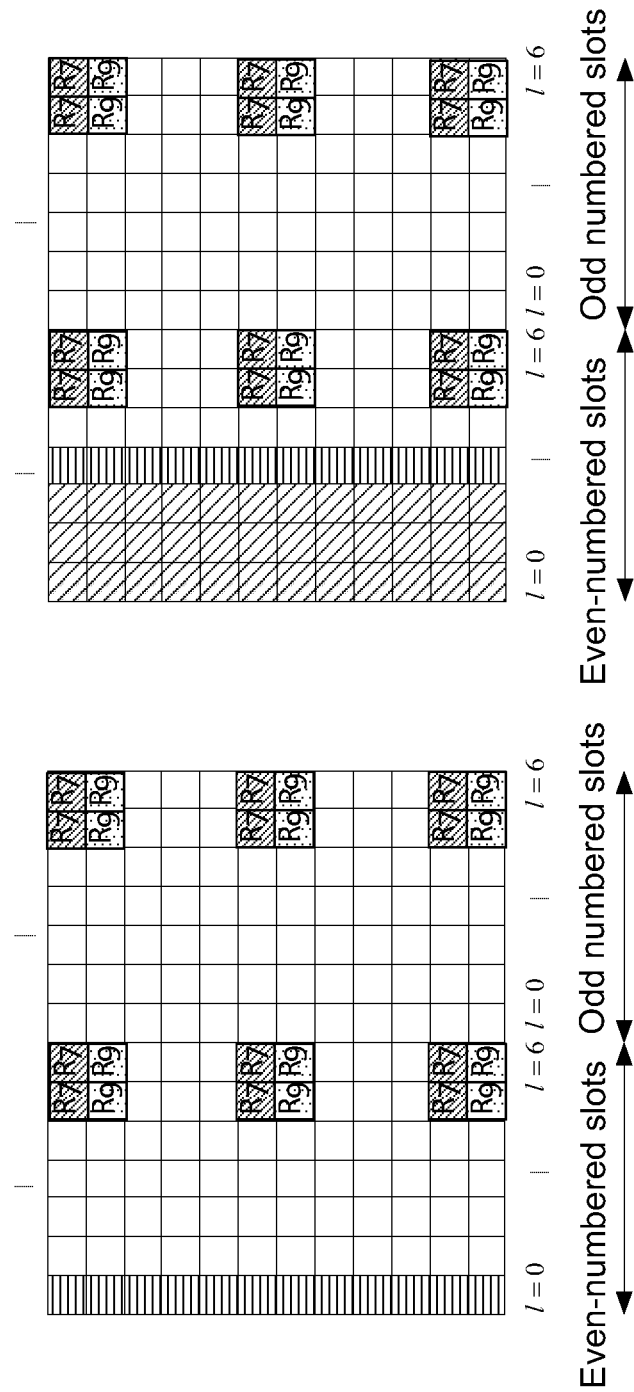
FIG. 13 is a schematic overview depicting exemplary resources for some carrier types according to some embodiments of the methods, the network node and user equipment.
FIG. 14 is a schematic overview depicting exemplary resources for some carrier types according to some further embodiments of the methods, the network node and user equipment.
Figure 15:
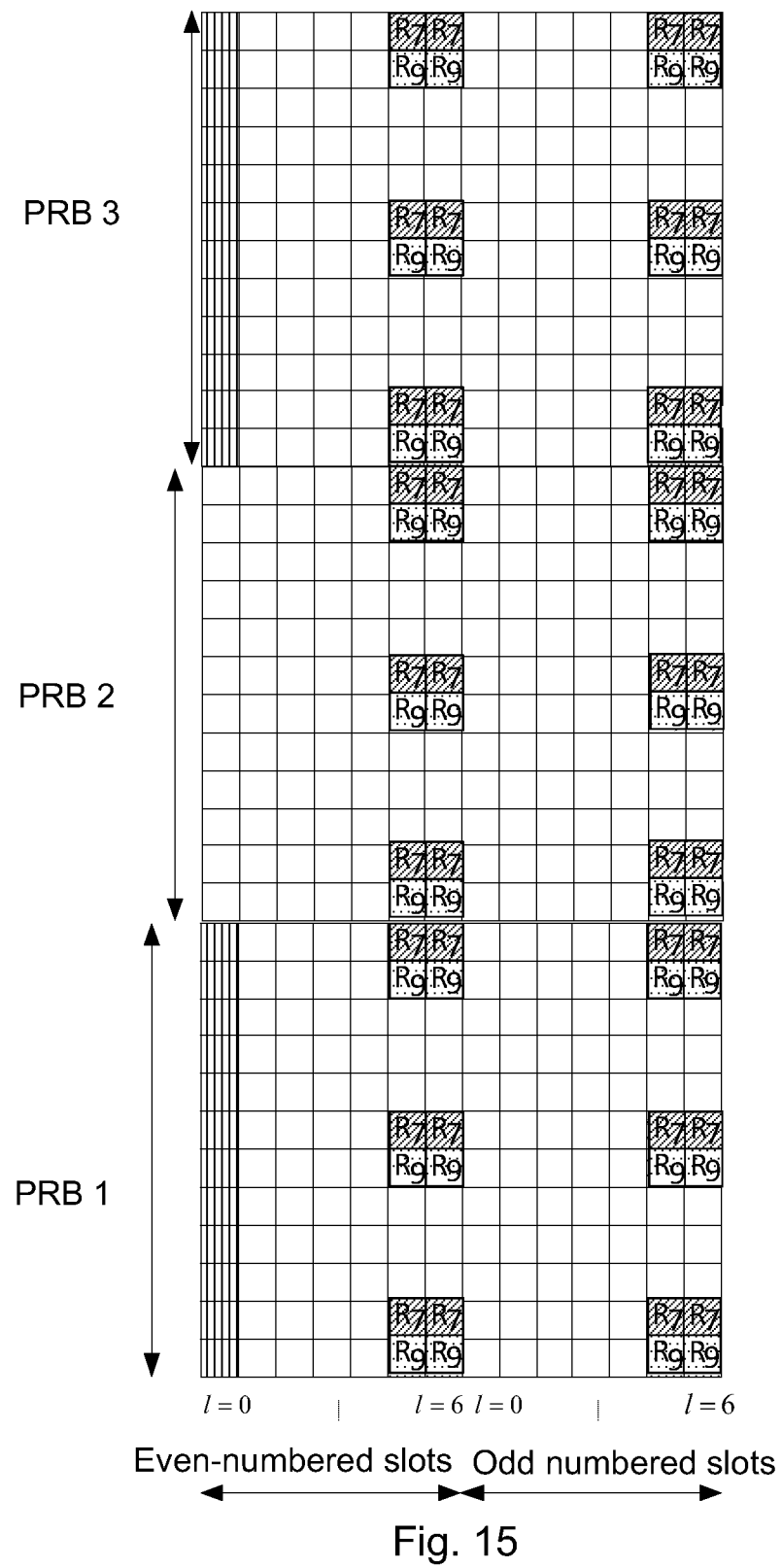
FIG. 15 is a schematic overview depicting exemplary resources for some carrier types according to some further embodiments of the methods, the network node and user equipment.

The PSICH transmission resource is described in more detail in reference to FIGS. 13-15. However, it should be noted that the network node 110 may in this action select/chose the PSICH transmission resource which corresponds to the PSIG of the user equipment 121. This selection/choice may be based on a criteria, which criteria may comprise one or more of:

the location of the resource elements to be allocated to the PSICH signal, that is, group signal, may be chosen based on the transmission mode and resources selected for the eCCH channels, that is, the control information, being transmitted. This may be performed so that some subset of blind decoding options to consider may be implicitly signalled to the user equipment 121, thus reducing blind decoding complexity.

Thus, the resource elements allocated in preparing the PSICH signal may be selected by the network node 110 based on their location in the resource blocks, and on the transmission mode of the control information or on resource elements allocated to the control information.

Furthermore, the network node 110 prepares at least one eCCH signal, that is, the control information, in the allocated resources for the user equipment 121. Additionally, in case the network node 110 determines that the data transmission is a downlink (DL) scheduling, the network node 110 may prepare a PDSCH signal in the allocated resources for the user equipment 121.

Action 1104

In this action, the network node 110 transmits the at least one prepared PSICH signal to the user equipment 121. The at least one prepared PSICH signal, i.e. the group signal, is transmitted in a data transmission of control information together with the control information for the user equipment 121, i.e. the eCCH signal, as described in Action 1006. In case of downlink (DL) scheduling, data transmission of control information may comprise a PDSCH signal in the allocated resources for the user equipments 121.

Thus, the network node 110 transmits the prepared group signal in the allocated resource elements in the time interval to the user equipment 121. This is performed such that the user equipment 121 is enabled to determine whether the control information allocated resource elements in the time interval is intended for the user equipment 121 or not.

Embodiments of a method in the user equipment 121 will now be described with reference to the flowchart depicted in FIG. 12. FIG. 12 is an illustrating example of a detailed flow chart for a procedure in the user equipment 121 for handling a control transmission from the network node 110; in other words, a more detailed procedure seen from the side of the user equipment 121 in the embodiment of the method shown in FIG. 10.

The flowchart in FIG. 12 describes the method in the network node 110 for transmitting control information to user equipments 121 in a telecommunications system 100. The control information is scheduled to be transmitted in downlink shared data channel time intervals. The scheduled control information is allocated resources elements in resource blocks of a time-frequency Orthogonal Frequency Division Multiplexing, OFDM, grid in its respective downlink shared data channel time interval. Furthermore, the flowchart in FIG. 12 comprises the following actions, and may be implemented for any of the above and below mentioned embodiments or in any combination with those. Note that the actions may be performed in any suitable order, and that all the steps performed may not be shown in order to simplify.

Action 1201

The user equipment 121 starts to receive a control information transmission comprising at least one PSICH signal, that is, the user equipment 121 starts to receive the data transmission of control information from the network node 110 as indicated in e.g. Action 1007. This is performed for each time interval the user equipment 121 is expecting a control information transmission, that is, a potential scheduling and transmission of a downlink (DL) shared data channel, from the network node 110. Thus, the user equipment 121 receives a control information transmission comprising a prepared group signal in a time interval in which the user equipment 121 is expecting a control information transmission from the network node 110.

If the user equipment 121 is not configured with at least one PSIG, the user equipment 121 may perform conventional blind decoding of the control information.

Action 1202

In this action, the user equipment 121 determines if the at least one PSICH signal in the control information transmission corresponds to at least one PSIG to which the user equipment 121 is assigned.

The user equipment 121 may for each PSIG for the user equipment 121, that is, for each PSIG to which the user equipment 121 is assigned, detect the presence of a PSICH signal corresponding to the PSIG, that is, a group signal corresponding to one or more of the groups of user equipments in the user equipments PSIG assignment.

In some embodiments, for implementing the detector of PSICH signals in the user equipment 121, the user equipment 121 may, if the PSICH signal consists of one sequence, directly correlate the received samples in the PSICH transmission resources with a PSICH sequence corresponding to its assigned PSIG(s).

The resulting samples, that is, the correlator output, may then be compared to a threshold value in the user equipment 121 to determine whether the PSICH signal is present.

For the case when the PSICH signal consists of more than one sequence, the user equipment 121 may perform multiple correlations with multiple sequences of the PSICH sequence in the user equipment 121. The resulting samples, that is, the correlator outputs, may then be combined. The combined value may then be compared to a threshold in the user equipment 121 to determine whether a PSICH signal is present or not.

An advantage with using this correlation detector structure is that the PSICH signal detection may be performed without assistance of any additional reference symbols. Also, the PSICH signal may comprise at least one sequence selected from a set of orthogonal sequences.

This means that the user equipment 121 may correlate information received in resource elements allocated to the PSICH signal with at least one sequence of a PSICH signal that is comprised in the user equipment 121, and compare the correlation with a threshold in order to determine whether a PSICH signal has been received.

Also, the detection threshold is selected to limit the probability of PSICH false alarm probability, that is, the probability that a PSICH signal is detected in the user equipment 121, but has not been sent by the network node 110 to the user equipment 121 and not actually been received by the user equipment 121. This PSICH false alarm probability may preferably be lower than 1% in order not to degrade eCCH operations.

If the user equipment 121 belongs to multiple PSIGs and the network node 110 select one PSIG for the PSICH signal transmission in each time interval, the detection threshold may preferably be selected to achieve a PSICH false alarm probability much lower than 1%, such as, for example, 0.1%. This may be performed such that the combined probability for all PSIGs does not increase over 1%.

If the user equipment 121 belongs to multiple PSIGs and the network node 110 selects more than one PSIG for the PSICH signal transmission in each time interval, the detection threshold setting may preferably be more relaxed than 0.1%, that is, larger than 0.1%. This is because the transmission of multiple signals in one interval will inherently cause more interference and a larger false alarm probability. Therefore, in order to keep the detection performance requirements consistent with the previous case above, the requirement may be relaxed a bit. Also, if the total number of PSIGs that the user equipment 121 is assigned to is the same, it may be preferable to have the total combined false alarm probability for all the PSIGs to be similar in both cases.

Additionally, the threshold may preferably be set so that the probability of missing a PSICH signal transmission is very low, such as, for example, 0.1%.

Furthermore, if the PSICH signal transmission, that is, the prepared group signal transmission, is based on the same antenna port(s) as those for the eCCH transmissions, that is, the control information, within the same resource block (PRB), then the use equipment 121 may treat the PSICH signal as part of the demodulation reference symbols (RS) for the eCCH transmissions within the same resource block (PRB) and use these signals to enhance its channel estimates. Thus, the user equipment 121 may determine which antenna ports and the number of antenna ports that are used in the control information transmission based on the antenna ports and number of antenna ports that are used for the PSICH signal.

If the user equipment 121 determines that the at least one PSICH signal in the control information transmission corresponds to at least one PSIG to which the user equipment 121 is assigned, the user equipment 121 may perform blind decoding and search of an eCCH addressed to the user equipment 121. The blind decoding may be restricted based on which of the embodiments listed earlier is used, that is, if any of the blind decoding options previously mentioned in Action 1102-1103 is used. Thus, the user equipment 121 may determine a subset of blind decoding options for the control information based on the location of the allocated resource elements of the PSICH signal and/or on the PSIG.

If the user equipment 121 detects an eCCH signal addressed to the user equipment 121, the user equipment 121 may perform functions according to the information carried in the detected eCCH signal. This means that the user equipment 121 may perform functions according to the functions in the decoded downlink control information (DCI). These functions may comprise receiving a PDSCH, performing an uplink (UL) transmissions, adjusting transmit power, etc.

Action 1203

In this action, the user equipment 121 ends the receiving of the control information transmission for the time interval when no PSIG assigned to the user equipment 121 correspond to the at least one PSICH signal. This means that when the user equipment 121 determines for the time interval that the prepared group signal is not corresponding to a group of user equipments to which the user equipment 121 is assigned and thereby that the control information in the time interval is not intended for the user equipment 121, the user equipment 121 ends the receiving of the control information transmission for the time interval. That is, since no PSICH signal corresponding to any PSIG for the user equipment 121 is detected, the user equipment 121 may stop receive the downlink (DL) transmission for the current downlink (DL) time interval, that is, the user equipment 121 can enter a micro-sleep stage for the time interval.

FIGS. 13 and 14 are schematic overviews depicting exemplary resources for some carrier types according to some embodiments of the methods, the network node 110 and user equipment 121.

In FIG. 13, a PSICH transmission resource and signal structure is presented to give an example of a PSICH resource for a new carrier type without legacy CRS and legacy control region. In this embodiment, a PSICH signal may occupy one OFDM symbol within a resource block (PRB) allocated for eCCHs. For new carrier types, the PSICH signal may, for example, be transmitted in the first OFDM symbol, as illustrated by the lined resource elements in FIG. 13.

In FIG. 14, a PSICH transmission resource and signal structure is presented to give an example of a PSICH resource for a legacy carrier type with legacy CRS and legacy control region.

For legacy carrier types, it may be preferable to avoid conflict with CRS and the legacy control region. Therefore, if the legacy carrier type is configured with one or two CRS ports, then the PSICH signal resource may be located in the first OFDM symbol after the legacy control region. That is, the PSICH signal resource may be located in the $2^{nd}$, $3^{rd}$ or $4^{th}$ OFDM symbol. This may depend on the size of the legacy control region. If the legacy carrier type is configured with four CRS ports, then the PSICH signal resource may be located in the $3^{rd}$ or $4^{th}$ OFDM symbol. This may depend on the size of the legacy control region.

Thus, the allocated resource elements in the resource blocks for a time interval for the PSICH signal may occupy one OFDM symbol within at least one resource block pair allocated for the control information transmission.

In some embodiments, a PSICH signal may be selected from a set of orthogonal sequences. In one exemplary embodiment, the set of orthogonal sequences is a set of Zadoff-Chu sequences. In another exemplary embodiment, the set of orthogonal sequences is a set of demodulation reference symbols (DMRS) defined in LTE for uplink (UL) transmissions. Multiple PSICH signals can be transmitted using the same PSICH radio resources because the PSICH signals are orthogonal. Thus, the PSICH signal may comprise at least one sequence selected from a set of orthogonal sequences. Also, the set of orthogonal sequences may comprise a set of Zadoff-Chu sequences and/or a set of demodulation reference symbols, DMRS, defined for uplink transmissions in the telecommunications system 100.

A PSICH signal can be transmitted from one antenna port or multiple antenna ports. For the single antenna port case, a PSICH signal consists of one sequence transmitted from one antenna port. For the case with two antenna ports, a PSICH signal consists of a pair of orthogonal sequences transmitted on the antenna ports using the same PSICH radio resources. The two orthogonal sequences may be obtained from applying different cyclic shifts to one sequence.

The antenna port(s) for PSICH transmissions may be identical to the antenna port(s) for eCCH transmissions in the same resource block (PRB). In some embodiments, this may similarly be used to signal to the user equipment 121 the number of antenna ports that are used for the eCCH transmission. This may reduce the blind decoding complexity.

In some other embodiments, the user equipment 121 may then assume, when more than one antenna port is used for the PSICH transmission, that the antenna ports used for the eCCH transmission are the same as the ones used for the PSICH transmission. It follows that use of a single antenna port does not provide any further information which may be used to reduce blind decoding options. However, thus, the PSICH signal may be transmitted using more than one antenna port, which more than one antenna port may be identical to the more than one antenna port used for the control information transmission.

FIG. 15 is a schematic overview depicting exemplary resources for some carrier types according to some further embodiments of the methods, the network node 110 and user equipment 121.

In FIG. 15, a PSICH transmission resource and signal structure is presented to give an example of a PSICH resource for a new carrier type without legacy CRS and legacy control region. In this embodiment, a PSICH signal occupies one OFDM symbol within multiple resource blocks (PRBs) allocated for an enhanced/extended control channel (eCCH). For new carrier types, PSICH may be transmitted in the first OFDM symbol, as illustrated by the lined resource elements in the resource blocks PRB 1 and 3 in FIG. 15. Thus, the allocated resource elements in the resource blocks for a time interval for the PSICH signal may occupy one OFDM symbol within at least one resource block pair allocated for the control information transmission.

For legacy carrier types, it may be preferable to avoid conflict with CRS and the legacy control region. Therefore, if the legacy carrier type is configured with one or two CRS ports, then the PSICH signal resource may be located in the first OFDM symbol after the legacy control region (as illustrated in the example of FIG. 14). That is, the PSICH signal resource may be located in the $2^{nd}$, $3^{rd}$ or $4^{th}$ OFDM symbol. This may depend on the size of the legacy control region. If the legacy carrier type is configured with four CRS ports, then the PSICH signal resource may be located in the $3^{rd}$ or $4^{th}$ OFDM symbol. This may depend on the size of the legacy control region.

For the exemplary case of two resource blocks (PRBs), a PSICH signal may consist of a pair of sequences selected from at least one set of orthogonal sequences. That is, different sets of orthogonal sequences may be assigned to different resource blocks (PRBs). As previously mentioned above, non-limiting examples of the set of orthogonal sequences may include Zandoff-Chu sequences and LTE UL DMRS sequences.

The two sequences of a PSICH signal may be transmitted in the two separate resource blocks (PRBs), as illustrated by the lined resource elements in the resource blocks PRB 1 and 3 in FIG. 15. The two sequences of the PSICH signal may also be transmitted via different antenna ports.

In some embodiments, the antenna port(s) for the PSICH signal transmissions may be identical to the antenna port(s) for eCCH transmissions in the same PRB. In some embodiments, the location in which the PSICH signal is transmitted may be associated to certain blind decoding options. This may reduce the complexity of the blind decoding at the user equipment 121. For example, receiving the PSICH signal on a lower frequency resource block (PRB), such as, for example, PRB 1 in FIG. 15, may indicate that a diversity transmission is being used for the eCCH. Correspondingly, receiving the PSICH signal on a higher frequency resource block (PRB), such as, for example, PRB 3 in FIG. 15, may indicate a localized or beamformed transmission. Thus, the transmission mode of the control information may comprise a diversity transmission, a localized transmission or a beamformed transmission.

In some embodiments, a PSICH sequence may be transmitted in one of the resource blocks (PRBs) that is to be used for sending the eCCH to the user equipment 121. Thus, receiving a PSICH signal allows the user equipment 121 to restrict its blind decoding options to include the resource block (PRB) on which the PSICH signal was received.

In some further embodiments, the PSICH signal may be transmitted in resource blocks (PRBs) other than those resource blocks allocated for eCCH transmissions. Thus, the resource elements allocated to the PSICH signal, may occupy one OFDM symbol within at least one resource block pair other than a resource block pair allocated for the control information transmission.

In some embodiments, the PSICH signal may be transmitted in the radio resources, that is, resource blocks, normally reserved for the Physical ConFiguration Indication CHannel (PCFICH) in a Long-Term Evolution (LTE) system. In some embodiments, the PSICH signal may be transmitted in the radio resources, that is, resource blocks, normally reserved for the Physical HARQ Indication CHannel (PHICH) in a Long-Term Evolution (LTE) system. In some embodiments, the PSICH signal may be transmitted in resource blocks (PRBs) that are used for a Physical Downlink Shared CHannel (PDSCH) transmission to the user equipment 121 for whom the PSICH signal is intended. Thus, the resource elements allocated to the PSICH signal, may be resource elements conventionally used for a Physical Configuration Indication CHannel, PCFICH, or a Physical HARQ Indicator CHannel, PHICH, or comprised in resource blocks that are used for a Physical Downlink Shared CHannel, PDSCH, transmission to the user equipment 121 for which the PSICH and the control information is intended.

Successful reception of the PSICH signal and the succeeding/subsequent eCCH indicating that the resource block (PRB) on which the PSICH signal is received is used for the PDSCH data transmission, allows the use equipment 121 to determine that the resource elements used for the PSICH signal are not to be used for the PDSCH. Thus, the number of resource elements available for the PDSCH in that resource block (PRB) is correspondingly reduced.

According to some embodiments and in an exemplary implementation, the PSICH signal may be taken from the set of six different cyclic shifts of a length-12 DMRS defined for LTE UL transmission. In the single antenna port case, up to six PSICH signals may be transmitted using the same radio resources. For the case with two antenna ports, up to three PSICH signals may be transmitted using the same radio resources. This is because each PSICH signal may consist of a pair of cyclic shifted sequences.

According to some embodiments and in another exemplary implementation, the first sequence of a PSICH signal may be taken from the set of six different cyclic shifts of a length-12 LTE UL DMRS, and the second sequence of a PSICH signal may be taken from the set of six different cyclic shifts of a different length-12 LTE UL DMRS. Therefore, up to six PSICH signals may be transmitted using the same radio resources.

Although the described embodiments above may be implemented in any appropriate type of telecommunication system supporting any suitable communication standards and using any suitable components, particular embodiments of the described solutions may be implemented in an LTE network, the example network may include one or more instances of wireless devices 121, e.g. mobile terminals, laptops, M2M-capable devices, or home base station, and one or more network nodes capable of communicating with these wireless devices, where examples of network nodes include eNBs 110, home base stations 110, positioning node (eSMLC), MME, SON node, and Gateway. Thus, some network nodes such as home base stations 110, 121 may in some scenarios be considered as wireless devices within the context of this disclosure. This is in particular true for small network devices where the form factor may significantly affect radio performance.

The example network may further include any additional elements suitable to support communication between wireless devices or between a wireless device and another communication device, such as, a landline telephone. Although the illustrated wireless devices may represent communication devices that include any suitable combination of hardware and/or software, these wireless devices may, in particular embodiments, represent devices such as the example wireless device 121 illustrated in greater detail by FIG. 17. Similarly, although the illustrated network nodes may represent network nodes that include any suitable combination of hardware and/or software, these network nodes may, in particular embodiments, represent devices such as the example network node 110 illustrated in greater detail by FIG. 16.

As shown in FIG. 17, the example wireless device 121 includes processing circuitry 1703, a memory 1702, radio circuitry 1701, and at least one antenna. The radio circuitry may comprise RF circuitry and baseband processing circuitry (not shown). In particular embodiments, some or all of the functionality described above as being provided by mobile communication devices or other forms of wireless device may be provided by the processing circuitry 1703 executing instructions stored on a computer-readable medium, such as the memory 1702 shown in FIG. 17. Alternative embodiments of the wireless device 121 may include additional components beyond those shown in FIG. 17 that may be responsible for providing certain aspects of the wireless device's functionality, including any of the functionality described above and/or any functionality necessary to support the solution described above.

To perform the method actions for transmitting control information to a user equipment 121, the network node 110 comprises the following arrangement depicted in FIG. 16. FIG. 16 shows a schematic block diagram of embodiments of the network node 110.

The network node 110 comprises a processing circuitry 1603 configured to determine for a time interval, a set of user equipments for which control information are scheduled in the time interval. It is also configured to select for a user equipment 121 comprised in the determined set of user equipments, at least one group of user equipments amongst one or more groups of user equipments to which the user equipment 121 is assigned. The processing circuitry 1603 is further configured to prepare a group signal corresponding to the selected one group of user equipments by allocating resource elements in the resource blocks of the time interval to the group signal. The processing circuitry 1603 is configured to then transmit the prepared group signal in the allocated resource elements in the time interval to the user equipment 121 such that the user equipment 121 is enabled to determine whether the control information allocated resource elements in the time interval is intended for the user equipment 121 or not. In some embodiments, the processing circuitry 1603 is configured to assign, in the network node 110, the user equipment 121 to one or more PSIG.

Furthermore, in some embodiments, the processing circuitry 1603 is further configured to send the group assignment(s) for the user equipment 121 to the user equipment 121. Alternatively, the processing circuitry 1603 may be configured to send a configuration message to the user equipment 121 to configure its user equipments settings such that the user equipment 121 is able to determine presence of a PSICH signal in received control information transmissions from the network node 110.

In a further embodiment, the processing circuitry 1603 is further configured to select the resource elements allocated in preparing the PSICH based on their location in the resource blocks, and on the transmission mode of the control information or on resource elements allocated to the control information.

When the user equipment 121 is assigned to more than one PSIG, the processing circuitry 1603 may be further configured to select, for the user equipment 121 amongst the more than one PSIG to which the user equipment 121 is assigned, the PSIG which comprises the highest number of user equipments for which control information are scheduled in the time interval. Alternatively, when the user equipment 121 is assigned to more than one PSIG, the processing circuitry 1603 may be further configured to select, for a user equipment 121 amongst the more than one PSIG to which the user equipment 121 is assigned, the PSIG based on the transmission mode of the control information or on resource elements allocated to the control information.

To perform the method actions for receiving control information from a network node 110, the user equipment 121 comprises the following arrangement depicted in FIG. 17. FIG. 17 shows a schematic block diagram of embodiments of the user equipment 121.

The user equipment 121 comprises a processing circuitry 1702 configured to receive a control information transmission comprising a prepared group signal in a time interval in which the user equipment 121 is expecting a control information transmission from the network node 110. It is also configured to, when determining for the time interval that the prepared group signal is not corresponding to a group of user equipments to which the user equipment 121 is assigned and thereby that the control information allocated resource elements in the time interval is not intended for the user equipment 121, end the receiving of the control information transmission for the time interval.

In some embodiments, the processing circuitry 1702 is further configured to receive one or more group assignment(s) indicating to the user equipment 121 which one or more PSIG the user equipment 121 is assigned to. Alternatively, the processing circuitry 1702 may be configured to receive a configuration message from the network node 110 to configure its user equipment settings such that the user equipment 121 is able to determine presence of a PSICH in received control information transmissions from the network node 110.

Furthermore, in some embodiments, the processing circuitry 1702 is further configured to determine a subset of blind decoding options for the control information based on the location of the allocated resource elements of the PSICH signal and/or on the PSIG. The processing circuitry 1702 may also be further configured to determine which antenna ports and the number of antenna ports that are used in the control information transmission based on the antenna ports and number of antenna ports that are used for the PSICH signal.

In some embodiments, the processing circuitry 1702 may be further configured to correlate information received in resource elements allocated to the PSICH signal with at least one sequence of a PSICH signal that is comprised in the user equipment 121, and compare the correlation with a threshold in order to determine whether a PSICH signal has been received.

Some of the above disclosed embodiments may have at least one of the following advantages.

The user equipment 121 may obtain knowledge that it is not scheduled for a subframe and stop receiving downlink (DL) signals prior to the end of the subframe. This may help the user equipment 121 to implement a micro-sleep feature that can improve user equipment energy consumption. This may, for example, further extend the user equipments battery life.

The PSICH signal transmission may be used to implicitly signal restrictions to the blind decoding options to be considered at the user equipment. This allows the user equipment 121 to reduce its processing time and may, for example, improve the user equipments ability to decode larger transport blocks and meet delay budget requirements for ACK/NAKs and retransmissions.

The radio resources used to signal the scheduling indication may be shared by several user equipments 121 to enhance spectral efficiency. The telecommunications system 100 may retain full control on radio resources used for PSICH signalling based on a trade-off between the operation efficiency of the telecommunications system and the energy consumption savings of the user equipment 121.

The PSICH signal structure may allow a low-cost, efficient and reliable method of detection to be implemented in the user equipment 121.

The PSICH signal, once detected in the user equipment 121, may assist in demodulation of other channels, such as, for example, eCCH and/or PDSCH, in the user equipment 121. This may be performed by using the PSICH signal in the user equipment 121 to enhance the channel estimation performance, as described in some embodiments above.

It should be noted that this disclosure as described herein is not limited only to Long Term Evolution (LTE) systems, but may also be related to and applied in any telecommunication system using OFDM, such as, for example, WiMax, LTE advanced etc.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be construed as limiting.

Abbreviations
AP Antenna port
CCE Control Channel Element
CDM Code-Division Multiplexing
CRS Common Reference Symbols
DCI Downlink Control Information
DL Downlink
DMRS Demodulation Reference Symbols
eCCH enhanced Control CHannel
eNB enhanced Node B
ePDCCH enhanced PDCCH
ePHICH enhanced PHICH
eREG enhanced Resource Element Group
eSMLC enhanced Serving Mobile Location Center
FDM Frequency-Division Multiplexing
MIMO Multiple-Input Multiple-Output
MME Mobility Management Entity
MU-MIMO Multiple UEs—MIMO
M2M Machine-to-machine
PBCH Physical Broadcast CHannel
PCFICH Physical Configuration Indication CHannel
PDCCH Physical Downlink Control CHannel
PDSCH Physical Downlink Shared CHannel
PHICH Physical HARQ indicator CHannel
PSIG Physical Scheduling Indication Group
PSICH Physical Scheduling Indicator Channel
RB or PRB Resource block
RE Resource Element
RN Relay Node
R-PDCCH Relay—Physical Downlink Control CHannel
RRH Remote Radio Head
RS Reference Signal
SINR Signal-to-Noise Ratio
SON Self-Organising Network
SU-MIMO Single UEs—MIMO
TDM Time-Division Multiplexing
UE User Equipment
UL Uplink

The invention claimed is:

1. A method, in a network node, for transmitting control information to a user equipment (UE) in a telecommunications system, wherein the control information is to is scheduled in time intervals of a downlink shared data channel, and wherein the control information is allocated resource elements in resource blocks of a time-frequency Orthogonal Frequency Division Multiplexing (OFDM) grid in the time intervals in which the control information is scheduled, the method comprising:
   determining a set of UEs for which control information is scheduled in a time interval;
   selecting, for a UE in the determined set of UEs, at least one Physical Scheduling Indication Group (PSIG) to which the UE is assigned, wherein the selecting comprises creating one or more group assignments, each of which assigns the UE to a PSIG;
   selecting a sequence from a set of orthogonal sequences to comprise a group signal corresponding to the at least one selected PSIG;
   preparing the group signal as a Physical Scheduling Indication Channel (PSICH) signal by allocating resource elements in the resource blocks of the time-frequency OFDM grid in the time interval of the downlink shared data channel to the group signal;
   transmitting the prepared group signal in the allocated resource elements in the time interval to the UE, to enable the UE to determine whether the control information that is allocated resource elements in the time interval is intended for the UE; and
   sending a configuration message to the UE to configure settings of the UE such that the UE is able to determine presence of a PSICH signal in control information transmissions received from the network node.

2. The method of claim 1 wherein each of the one or more group assignments are made based on a UE ID, a sub-frame number, or a cell-ID.

3. The method of claim 1 further comprising sending the one or more group assignments for the UE to the UE.

4. The method of claim 1 wherein the configuration message comprises the one or more group assignments for the UE.

5. The method of claim 1 wherein the resource elements allocated in preparing the PSICH signal are selected based on their location in the resource blocks and the transmission mode of the control information, or based on resource elements allocated to the control information.

6. The method of claim 5 wherein the location of the allocated resource elements the selected PSIG, or both, indicate a subset of blind decoding options for the control information to the UE.

7. The method of claim 5 wherein the transmission mode of the control information comprises a diversity transmission, a localized transmission, or a beamformed transmission.

8. The method of claim 1:
   wherein the UE is assigned to more than one PSIG;
   wherein selecting a PSIG comprises selecting a PSIG, amongst the more than one PSIG to which the UE is assigned, which includes the highest number of UEs for which control information are scheduled in the time interval.

9. The method of claim 1:
   wherein the UE is assigned to more than one PSIG;
   wherein selecting a PSIG comprises selecting a PSIG, amongst the more than one PSIG to which the UE is assigned, based on the transmission mode of the control information or based on resource elements allocated to the control information.

10. The method of claim 1 wherein the set of orthogonal sequences comprises a set of Zadoff-Chu sequences, a set of demodulation reference symbols (DMRS), or both, defined for uplink transmissions in the telecommunications system.

11. The method of claim 1:
wherein the PSICH signal is transmitted using more than one antenna port;
wherein the more than one antenna ports are identical to the more than one antenna ports used for the control information transmission.

12. The method of claim 1 wherein the allocated resource elements in the resource blocks for the time interval used in preparing the PSICH signal occupy one OFDM symbol within at least one resource block pair allocated for the control information transmission.

13. The method of claim 1 wherein the resource elements allocated in preparing the PSICH signal occupy one OFDM symbol within at least one resource block pair other than a resource block pair allocated for the control information transmission.

14. The method of claim 13 wherein the resource elements allocated in preparing the PSICH signal are:
resource elements conventionally used for a Physical Configuration Indication Channel (PCFICH);
resource elements conventionally used for a Physical HARQ Indicator CHannel (PHICH); or
included in resource blocks that are used for a Physical Downlink Shared CHannel (PDSCH) transmission to the user equipment for which the PSICH and the control information is intended.

15. A network node for transmitting control information to a user equipment (UE) in a telecommunications system, wherein the control information is scheduled in time intervals of a downlink shared data channel, and wherein the control information is allocated resource elements in resource blocks of a time-frequency Orthogonal Frequency Division Multiplexing (OFDM) grid in the time intervals in which the control information is scheduled, the network node comprising processing circuitry configured to:
determine a set of UEs for which control information is scheduled in a time interval;
select, for a UE included in the determined set of UEs, at least one Physical Scheduling Indication Group (PSIG) to which the UE is assigned;
create one or more group assignments, each of which assigns the UE to a PSIG;
select a sequence from a set of orthogonal sequences to comprise a group signal corresponding to the at least one selected PSIG;
prepare the group signal as a Physical Scheduling Indication Channel (PSICH) signal group by allocating resource elements in the resource blocks of the time-frequency OFDM grid in the time interval of the downlink shared data channel to the group signal;
transmit the prepared group signal in the allocated resource elements in the time interval to the UE, to enable the UE to determine whether the control information that is allocated resource elements in the time interval is intended for the UE; and
send a configuration message to the UE to configure settings of the UE such that the UE is able to determine presence of a PSICH signal in control information transmissions received from the network node.

16. The network node of claim 15 wherein the processing circuitry is further configured to send the one or more group assignments for the UE to the UE.

17. The network node of claim 15 wherein the processing circuitry is further configured to select the resource elements allocated in preparing the PSICH based on their location in the resource blocks and on the transmission mode of the control information, or based on resource elements allocated to the control information.

18. The network node of claim 15:
wherein the UE is assigned to more than one PSIG;
wherein the processing circuitry is configured to select a PSIG from the more than one PSIG by selecting the PSIG having the highest number of UEs for which control information is scheduled in the time interval.

19. The network node of claim 15:
wherein the user equipment is assigned to more than one PSIG;
wherein the processing circuitry is configured to select a PSIG from the more than one PSIG based on the transmission mode of the control information or based on resource elements allocated to the control information.

20. A method, in a user equipment (UE), for receiving control information from a network node in a telecommunications system, wherein the control information is scheduled in time intervals of a downlink shared data channel, and wherein the control information is allocated resource elements in resource blocks of a time-frequency Orthogonal Frequency Division Multiplexing (OFDM) grid in the time intervals in which the control information is scheduled, the method comprising:
receiving a control information transmission comprising a prepared group signal and control information in a time interval in which the UE is expecting a control information transmission from the network node, wherein the prepared group signal is a Physical Scheduling Indication Channel (PSICH) signal comprising at least one sequence selected by the network node from a set of orthogonal sequences;
receiving one or more group assignments, each of which indicates to the UE a Physical Scheduling Indication Group (PSIG) to which the UE is assigned by the network node;
receiving a configuration message from the network node to configure the UE settings such that the UE is able to determine presence of a PSICH signal in received control information transmissions from the network node; and
terminating, for the remainder of the time interval, the receiving of the control information transmission responsive to a determination that the prepared group signal does not correspond to one or more PSIGs to which the UE is assigned, and that the control information that is allocated resource elements in the time interval is therefore not intended for the UE.

21. The method of claim 20 wherein the configuration message comprises the assignment of the UE to the one or more groups of UEs.

22. The method of claim 20 further comprising determining a subset of blind decoding options for the control information based on the location of the allocated resource elements of the PSICH signal, the assigned PSIG, or both.

23. The method of claim 20 further comprising determining which antenna ports and the number of antenna ports that are used in the control information transmission based on the antenna ports and number of antenna ports that are used for the PSICH signal.

24. A user equipment (UE) for receiving control information from a network node in a telecommunications system, wherein the control information is scheduled in time intervals of a downlink shared data channel, and wherein the control information is allocated resource elements in resource blocks of a time-frequency Orthogonal Frequency Division Multiplexing (OFDM) grid in the time intervals in which the control information is scheduled, the user equipment comprising processing circuitry configured to:

receive a control information transmission comprising a prepared group signal in a time interval in which the UE is expecting a control information transmission from the network node, wherein the selected group signal is a Physical Scheduling Indication Channel (PSICH) signal comprising at least one sequence selected by the network node from a set of orthogonal sequences;

receive one or more group assignments, each of which indicates to the UE a Physical Scheduling Indication Group (PSIG) to which the UE is assigned by the network node;

receive a configuration message from the network node to configure the UE settings such that the UE is able to determine presence of a PSICH signal in received control information transmissions from the network node;

terminate, for the remainder of the time interval, the receiving of the control information transmission responsive to a determination that the prepared group signal does not correspond to one or more PSIGs to which the UE is assigned, and that the control information that is allocated resource elements in the time interval is therefore not intended for the user equipment.

25. The UE of claim 24 wherein the processing circuitry is further configured to determine a subset of blind decoding options for the control information based on the location of the allocated resource elements of the PSICH signal, the assigned PSIG, or both.

26. The UE of claim 24 wherein the processing circuitry is further configured to determine which antenna ports and the number of antenna ports are used in the control information transmission based on the antenna ports and number of antenna ports that are used for the PSICH signal.

27. The method of claim 20 wherein receiving the PSICH signal comprises:
performing mathematical correlation to information received in resource elements allocated to the PSICH signal with at least one sequence of a PSICH signal that is included in the UE;
comparing the correlation with a threshold in order to determine whether a PSICH signal has been received.

28. The UE of claim 24 wherein, when the UE is receiving the control information transmission, the processing circuitry is configured to:
perform mathematical correlation to information received in resource elements allocated to the PSICH signal with at least one sequence of a PSICH signal that is included in the UE;
compare the correlation with a threshold in order to determine whether a PSICH signal has been received.

29. The method of claim 11, wherein the PSICH signal comprises a pair of orthogonal sequences transmitted on the more than one antenna port using one or more same radio resources.

30. The method of claim 29, further comprising obtaining the pair of orthogonal sequences from applying different cyclic shifts to one sequence of the set of orthogonal sequences.

* * * * *